(12) United States Patent
Pan

(10) Patent No.: US 6,304,764 B1
(45) Date of Patent: Oct. 16, 2001

(54) HANDS-FREE CELLULAR PHONE KIT

(75) Inventor: Chun H. Pan, Cupertino, CA (US)

(73) Assignee: Priority Tech, Inc., Fremont, CA (US)

( * ) Notice: Subject to any disclaimer, the term of this patent is extended or adjusted under 35 U.S.C. 154(b) by 0 days.

(21) Appl. No.: 09/442,215

(22) Filed: Nov. 17, 1999

Related U.S. Application Data

(60) Provisional application No. 60/115,189, filed on Jan. 6, 1999.

(51) Int. Cl.[7] ............................................. H04B 1/38
(52) U.S. Cl. ........................ 455/569; 455/557; 455/575
(58) Field of Search ................................ 455/569, 568, 455/572, 573, 575, 90, 99, 556, 557, 563; 379/420, 449, 455

(56) References Cited

U.S. PATENT DOCUMENTS

| | | | |
|---|---|---|---|
| 4,875,229 | 10/1989 | Palett et al. ................. | 379/58 |
| 4,896,370 | 1/1990 | Kasparian et al. ............ | 455/77 |
| 5,187,744 | * 2/1993 | Richter ........................ | 379/449 |
| 5,202,913 | 4/1993 | Lang et al. ................... | 379/58 |
| 5,261,121 | 11/1993 | Hashimoto ................... | 455/89 |
| 5,418,836 | 5/1995 | Yazaki ......................... | 379/58 |
| 5,537,673 | 7/1996 | Nagashima et al. .......... | 455/346 |
| 5,781,850 | 7/1998 | Ugge' et al. ................. | 455/149 |
| 5,797,088 | 8/1998 | Stamegna .................... | 455/345 |
| 5,974,333 | * 10/1999 | Chen ........................... | 455/569 |
| 6,058,298 | 5/2000 | Stamegna .................... | 455/345 |
| 6,075,999 | * 6/2000 | Vilmi et al. .................. | 455/557 |
| 6,081,724 | * 6/2000 | Wilson ......................... | 455/569 |
| 6,085,078 | 7/2000 | Stamegna .................... | 455/345 |
| 6,101,403 | * 8/2000 | Masuda ....................... | 455/569 |
| 6,131,042 | * 10/2000 | Lee et al. ..................... | 455/556 |
| 6,134,456 | * 10/2000 | Chen ........................... | 455/556 |

FOREIGN PATENT DOCUMENTS

| | | | |
|---|---|---|---|
| 0920170A2 | 6/1999 | (EP) | H04M/1/60 |
| 2264613A | 9/1993 | (GB) | H04B/7/26 |
| WO 96/18275 | 6/1996 | (WO) . | |
| WO96/18275 | 6/1996 | (WO) | H04Q/7/32 |
| WO96/32783 | 10/1996 | (WO) | H04B/1/38 |
| WO97/13332 | 4/1997 | (WO) | H04B/5/06 |
| WO98/12867 | 3/1998 | (WO) | H04N/1/60 |
| WO98/39896 | 9/1998 | (WO) | H04M/1/60 |

\* cited by examiner

*Primary Examiner*—Nay Maung
*Assistant Examiner*—Quochien B. Vuong
(74) *Attorney, Agent, or Firm*—Sierra Patent Group, Ltd.; Andrew V. Smith

(57) ABSTRACT

A hands-free system for communicating over a cellular phone connection without handling the cellular phone is provided including a powered hands-free kit to which a cellular phone is connected. The hands-free kit has an electrical circuit and connector for exchanging audio information with the cellular phone. The hands-free kit also includes a condenser microphone for receiving audio data from the user and transmitting it through the user's cellular phone handset to a person with whom he is communicating by cellular connection. The hands-free kit may transmit through a cassette device or a FM transmitter audio information to a car stereo system such that audio information may be reproduced through the speakers of the car stereo system for excellent sound quality and versatility. Thus, one or more users may participate in a conference call utilizing the condenser microphone and stereo speakers of the car within which they are riding. The system is powered by the electrical system of a motor vehicle through the cigarette lighter and the cellular phone is also rechargeable thereby.

37 Claims, 11 Drawing Sheets

HANDS-FREE CELLULAR PHONE KIT

PRIORITY

This application claims the benefit of priority to U.S. Provisional Patent Application No. 60/115,189, filed on Jan. 6, 1999.

BACKGROUND OF THE INVENTION

1. Field of the Invention

The present invention relates to cellular phone accessories, and particularly to accessories that permit hands-free use of a cellular phone in an environment such as in an automobile, and that work in synergistic relationship with pre-existing automobile audio technology.

2. Description of the Related Art

The cellular phone is becoming an increasingly attractive option for persons who wish to communicate with business or personal acquaintances even though they are away from their home or office telephone. Cellular phones are often efficiently used when a person is travelling between two destinations that each have conventional telephone capabilities. The most common scenario is a person travelling to work from home or vice-versa, or when travelling between two business destinations. Such travelling typically involves driving a car.

For an automobile having a manual transmission, two hands are required for manipulating the controls, i.e., one for steering and one for shifting gears. Even for an automobile with an automatic transmission, it is recommended to have two hands on the wheel at all times. Cellular phones, like any other phones, include a handset with a microphone and a speaker so that the user may, respectively, speak with and listen to the person at the other end of a call by holding the phone in one hand. Disadvantageously then, when a person is holding a cellular phone in one hand, only one other hand remains free for manipulating the controls of the automobile such as the steering wheel and the stick shift. It is recognized in the present invention that it is desired that a person be able to talk on a cellular phone while having two hands free to properly manipulate the controls of an automobile.

Another disadvantage of using a cellular phone handset is that only two persons can typically participate in a single call, without one person relaying to a third person what a person at the other end is saying or without handing the phone back and forth between persons. If a cellular phone were simply held or set down on a seat between two persons both wishing to communicate with the person at the other end, neither of the two persons would be able to effectively hear, nor would the person at the other end be able to hear either of the two persons without everyone shouting excessively. It is recognized in the present invention that it is desired to be able to hold a "conference call" through a cellular phone connection in an automobile.

SUMMARY OF THE INVENTION

In a first aspect of the invention, a hands-free cellular telephone kit includes a jack having an ampifier and a speaker. The jack is connected to a cellular telephone and a microphone is connected to the jack, and may be built into the jack. The jack receives, amplifies and retransmits through the speaker a communication from another cellular telephone user during a cellular telephone call. Using the microphone, the jack further retransmits a communication to the other cellular telephone user. The jack advantageously permits these cellular telephone communications when the cellular telephone is positioned away from the user.

In a second aspect of the invention, a hands-free cellular telephone kit includes a jack having an ampifier and being connected to a cellular telephone. The jack is connected to a microphone, which may be built into the jack, and an audio override cassette inserted into a cassette player of an automobile. The jack receives, amplifies and retransmits a communication from another cellular telephone user during a cellular telephone call to the speaker system associated with the cassette player of the automobile. The jack also retransmits a communication to the other user via the microphone when the cellular telephone is positioned away from the user. The cassette may be wired to the jack, or the cassette may communicate with the jack using an IR transmission between the cassette and the jack.

In a third aspect of the invention, a hands-free cellular telephone kit includes a jack having an audio-FM converter and FM transmitter circuit and being connected to a cellular telephone. A microphone is connected to the jack, and may be built into the jack. The jack receives, converts and transmits a communication from another cellular telephone user during a cellular telephone call to a FM receiver of an automobile audio system for subsequent audio transmission over the speaker system associated with the audio system. The jack retransmits a further communication to the other user through the microphone even though the user is positioned away from the cellular telephone.

The audio FM converter and FM transmitter circuit preferably includes an audio interface for converting audio information picked up by the microphone, a microcontroller for preferably processing frequency selection input from the user, a frequency synthesizer, and a FM transmitter for receiving the converted signal from the audio interface and transmitting the signal at the frequency selected by the user over the automobile speaker system. The FM transmitter circuit may be configured to allow tuning between two or more or a continuous range of FM frequencies, or to just one. The jack preferably includes a display that shows the selected frequency.

A fourth aspect of the invention is a combination of the first and third aspects of the invention. That is, the hands-free kit includes a jack having a speaker according to the above first aspect and also having a FM transmitter circuit according the above third aspect. The FM transmitter can be used according to the fourth aspect for the advantages described above with respect to the third aspect of the invention. However, when none of the frequencies that the FM transmitter circuit is configured for transmission at is available, or a particular automobile within which the user is riding doesn't have FM capability, then a switch can be used so divert the audio information to the speaker in the jack. The switch allows a user to change between using the FM transmitter and the car audio speakers and using the speaker in the jack without interruption of the cellular phone conversation.

Also preferably included with the hands-free kit according to any of the above aspects of the invention is a holder which holds the cellular telephone. The holder may include a clip for connecting to louvres of a vent in the automobile, or may be attached to a dashboard or other surface within the automobile's interior. The holder is advantageously rotatably adjustable in preferably more than one independent direction, and may be translationally adjustable. The holder may have its own microphone built in, wherein the other microphone is disabled when the cellular telephone is in the holder. The holder may comprise the jack and/or the functional or structural equivalents of the jack, as set forth herein. The holder may have a built in speaker that may be used in lieu of the speaker in the jack or the speakers of the automobile audio system.

A power adapter may be connected the jack and configured to be connected to a cigarette lighter for providing power to the jack. Alternatively, the power adapter may be powered by a separate source such as a battery, or a battery may be built into the jack.

BRIEF DESCRIPTION OF THE DRAWINGS

FIG. 2b shows schematically a jack according to the first aspect of the invention shown in block form at FIG. 2a.

FIG. 3b shows schematically a jack according to the second aspect of the invention shown in block form in FIG. 3a.

FIG. 4b shows schematically a jack according to the third aspect of the invention shown in block form in FIG. 4a.

DETAILED DESCRIPTION OF THE PREFERRED EMBODIMENT

Figure 1:
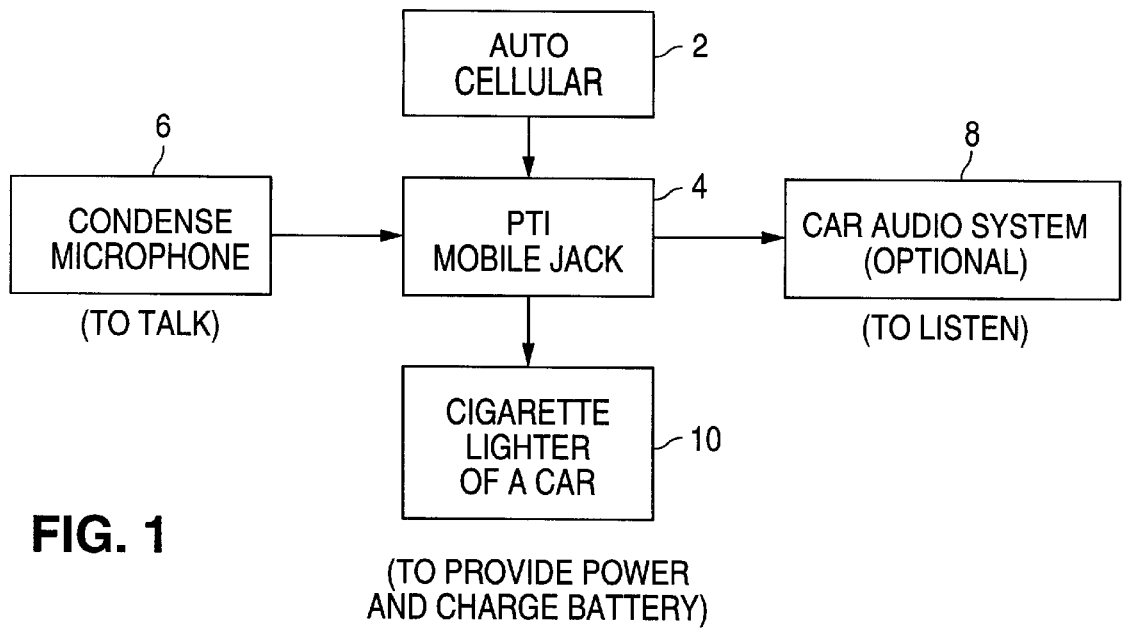
FIG. 1 is a block diagram of a system according to a preferred embodiment of the present invention including a car audio system connection feature.

Referring to FIG. 1, a hands free kit for connecting with a cellular phone 2 in accord with a preferred embodiment of the present invention generally includes a mobile jack 4 and a condenser microphone 6. The condenser microphone 6 may be separate from the jack 4, or the microphone 6 may be integrated with the jack 4.

The jack 4 may have its own audio output and as such an amplifier and a speaker are integrated with the jack 4. The jack 4 may alternatively transmit audio data to the car audio system 8 of an automobile. With this option, the car audio system speakers may be advantageously used for outputting the audio information to a person or persons situated in the automobile.

The jack 4 preferably has a power connection to the cigarette lighter 10 of the automobile. The connection of the jack 4 to the cigarette lighter 10 serves to power the jack and to recharge the battery of the cellular phone 2. The jack 4 may also be powered by the battery associated with the cellular phone 2 or another battery specifically associated with the jack 4, such as may be integrated with or connected to the jack 4.

Figure 2A:
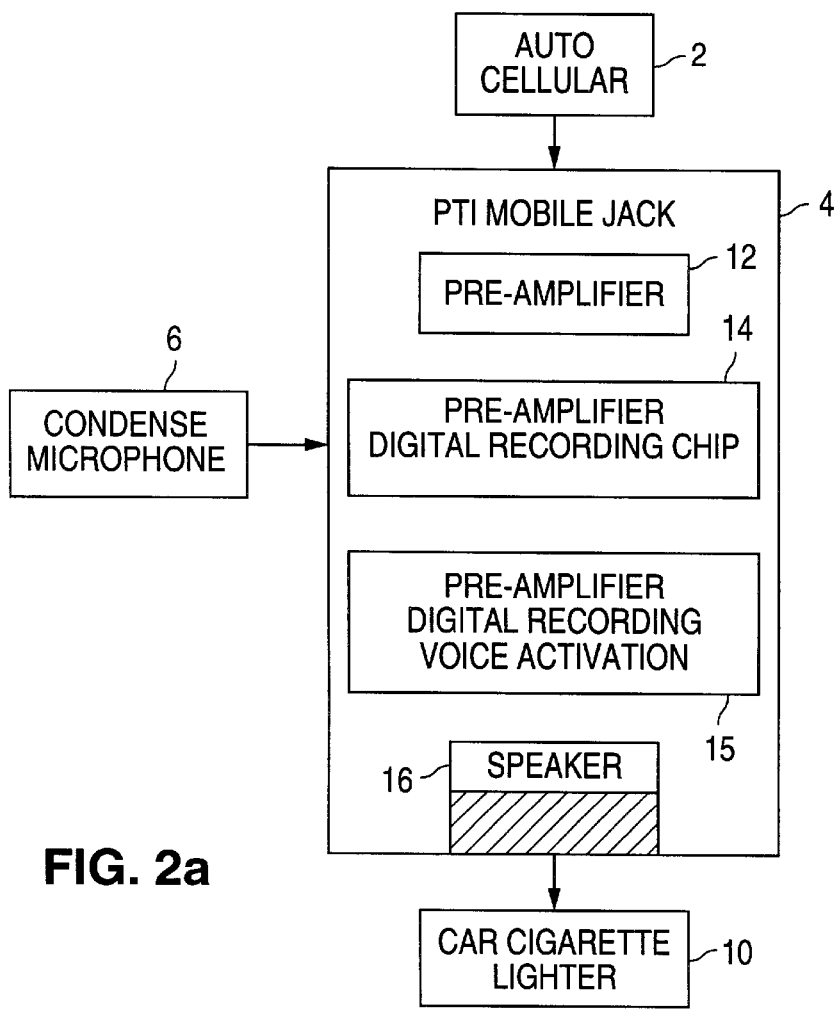
FIG. 2a is a block diagram of a preferred embodiment of the present invention according to the first aspect of the invention including a jack having a preamplifier, and preferably including built in voice activation and digital recording features.

FIG. 2a is a block diagram of a preferred embodiment in accord with a first aspect of the present invention including a jack 4 connected to a cellular phone 2 and having an audio receiver such as preferably a condenser microphone 6 connected to or integrated with the jack 4. The jack 4 preferably has a preamplifier 12, and may also include a digital recording feature 14 and/or a voice activation feature 15. The jack also has an integrated speaker 16.

The first aspect of the invention shown in block form in FIG. 2a features the jack 4 to which the cellular phone 2 is connected. The jack 4 has the audio receiver which is preferably the condenser microphone 6 connected or integrated with it for receiving audio information from a user or users preferably riding in an automobile. A first electrical circuit for communicating with the cellular phone, and particularly for exchanging audio information data with the cellular phone, is provided with the hands-free kit. Audio data received from the cellular phone handset is transmitted to the user's ears by a speaker 16 within the jack 4 or by an earphone (not shown). The hands-free kit is preferably powered by a connection to the cigarette lighter 10 of an automobile, and the cellular phone 2 is rechargeable thereby.

Preferably, the jack 4 of the hands-free kit according to the first aspect of the invention includes a digital chip for audio recording and/or reproduction. The jack 4 preferably has a integrated second electrical circuit including a digital recording chip 14 or recording and reproducing audio information data, including personal notes received from the user by the condenser microphone 6 and/or portions of a cellular conversation between two or more persons. The recording and reproduction functions of the chip 14 are controlled by a switch (not shown) either on the jack 4 or otherwise electrically connected to the chip 14 for selective recording and reproduction. Audio input information may be stored on and played back from the chip 14 at a later time. Such audio input may be selected portions of a cellular phone conversation or the user's personal notes recorded while not participating in a cellular phone conversation.

Advantageously, the recording of notes may be performed either completely hands-free if the digital recording and/or reproduction is initiated and terminated by voive activation in accord with the the voice activation feature described below, or mostly hands-free with the exception of having to flip a recording/reproduction switch or push a button. In either case, the user does not have to write notes with a pencil or pen onto a paper while also manipulating the controls of the automobile.

Also preferably, the jack 4 includes a voice activation chip 15. The voice activation chip 15 may be separate from or integrated with the digital recording chip 14. The second electrical circuit including the digital recording/reproduction chip 14 or a third electrical circuit includes the digital voice activation chip. A cellular connection may be thereby initiated or completed using audio input data instead of keypad input data. Advantageously, initiation and/or completion of a cellular phone conversation may be performed hands free in accord with this feature of the invention.

Figure 2B:
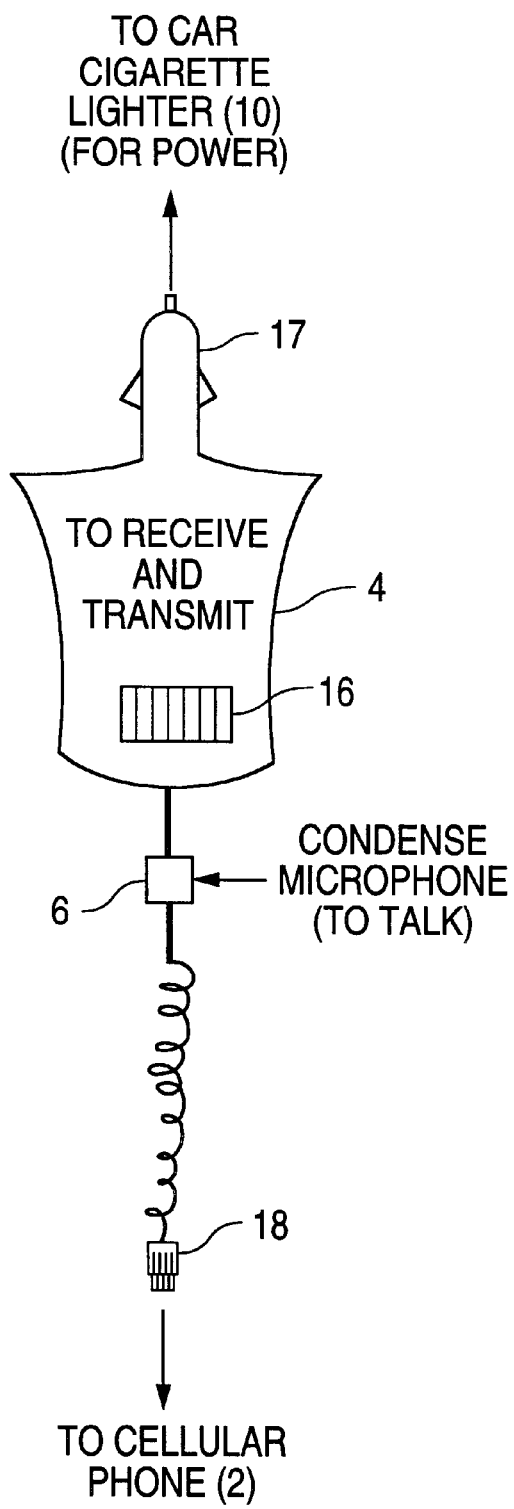

FIG. 2b shows schematically a jack 4 according to the first aspect of the invention shown in block form at FIG. 2a. The connector 17 is shown configured for insertion into a cigarette lighter 10. The connector 17 may also connect with the jack 4 by an elongated connection or wire for ease of connection. AT the other end of the jack 4, an electrical connection is shown to the microphone 6 which continues to a connector 18 to the cellular phone 2. Various connectors 18 can be used depending on the brand of the cellular phone 2 or input configuration associated with the particular cellular phone 2 being used. The audio output is again shown to be from a speaker 16 integrated with the jack 4. As discussed above with respect to FIG. 2a, but not shown in FIG. 2b, the jack 4 may feature voice activation and digital recording and/or reproduction.

Figure 3A:
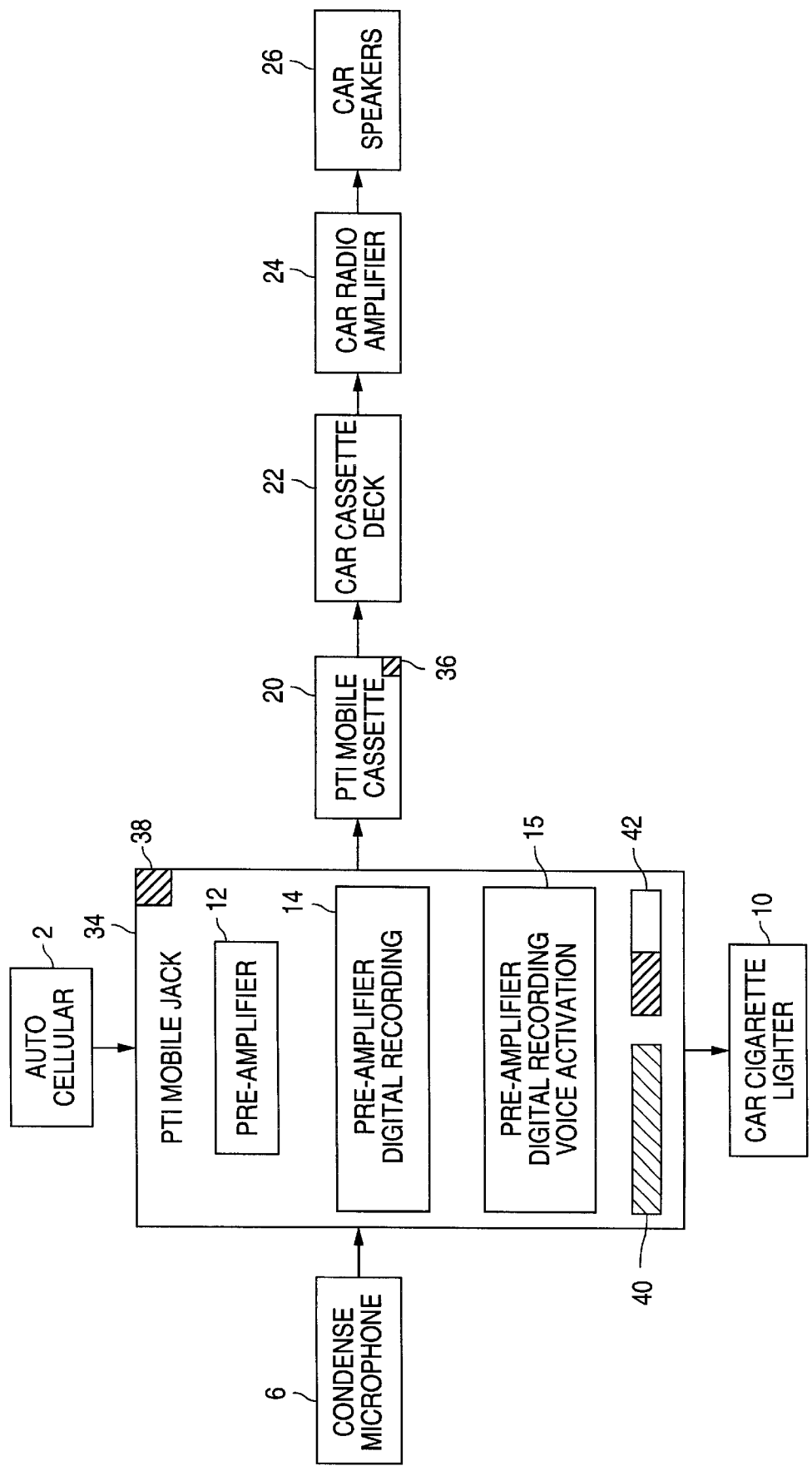
FIG. 3a is a block diagram of a preferred embodiment of the present invention according to a second aspect of the invention including a jack having a mobile cassette override connection to a car audio system.

FIG. 3a is a block diagram of a preferred embodiment of the present invention according to a second aspect of the invention. Similar features of the system described above with respect to FIGS. 2a–2b will not be repeated here. The hands-free kit according to the second aspect of the invention includes a jack 34 having a mobile cassette override connection to a car audio system. The automobile audio system is used by inserting a cassette device 20 connected to the jack 34 of the hands-free kit into the cassette deck 22 of the stereo. The cassette device 20 may be wired to the jack 34, or the cassette device may have an IR receiver 36 for communicating with an IR transmitter 38 in the jack 34 for enabling the use of the audio system and transmitting the information to be broadcast over the speakers 26 of the automobile audio system. A home stereo system having a similarly configured cassette deck 22 may also be used in the same way.

Audio data received by the cellular phone from the person with whom the user is communicating by cellular connection is advantageously output through the speakers 26 of the car stereo via the car stereo amplifier 24 such that anyone riding in the car may hear clearly. The connection to the audio device, preferably the car stereo system, allows audio information to be communicated through the jack 34 of the hands-free kit to the speakers 26 of the car stereo system via the cassette device 20 which overrides the car stereo. The connection between the hands-free kit and the car speakers 26 through the cassette device 20 is achieved by inserting the cassette device 20 into the cassette player 22 of the car stereo. The car stereo is then overridden allowing audio data from the hands-free kit to be output through the car speakers 26. The cellular phone may also ring through the speakers 26. Also, also not shown, a switch is preferably provided for switching between using the car stereo system for cellular communication and for listening to other input such as from a radio station or compact disk.

The jack 34 may optionally be configured with a speaker 40, such as described above with respect to the first aspect. A switch 42 is also provided in this option of the second aspect of the invention. The switch 42 allows a user to select between using the cassette override and the car speakers 26, or the speaker 40 of the jack 34, without interrupting a cellular phone conversation. This option is advantageous because some automobiles do not have a cassette player 22.

Advantageously, the already available car stereo system is used and the jack 34 doesn't have to include an audio output mechanism including a speaker, such as described above. Although not shown, a speaker is nonetheless provided with the jack 34 in this aspect for situations when the car doesn't have a stereo with a cassette deck 22. The car stereo provides a clear sound and the volume is easily adjusted to a comfortable level. In addition, multiple persons riding in the automobile may participate easily in a conference call over a cellular connection.

Figure 3B:
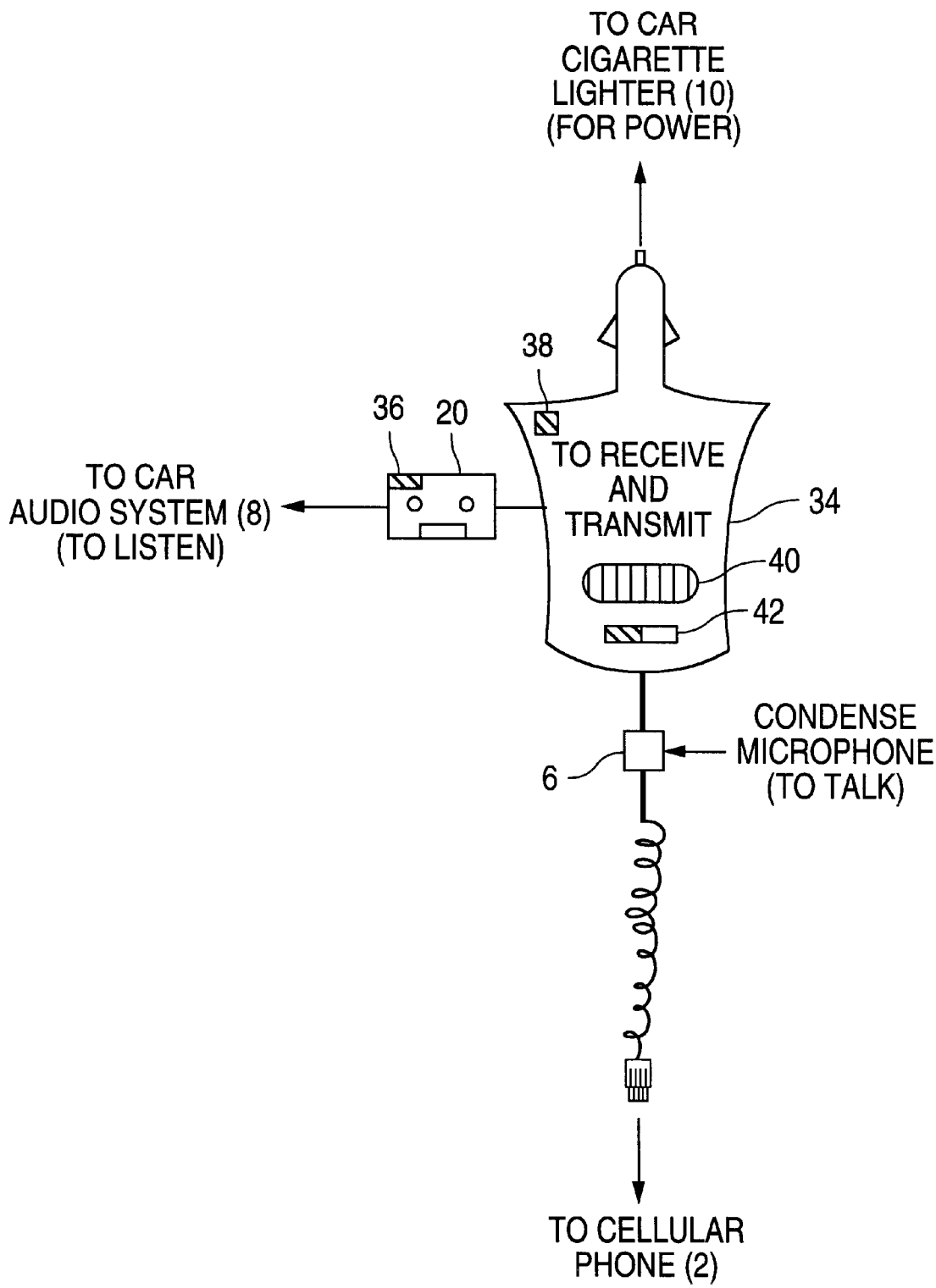

FIG. 3b shows schematically a hands-free kit including a jack 34 according to the second aspect of the invention shown in block form in FIG. 3a. The hands-free kit shown schematically at FIG. 3b is the same as that shown in FIG. 2b, except the jack 34 has a connection to a mobile cassette device 20, as described above with respect to FIG. 3a.

Figure 4A:
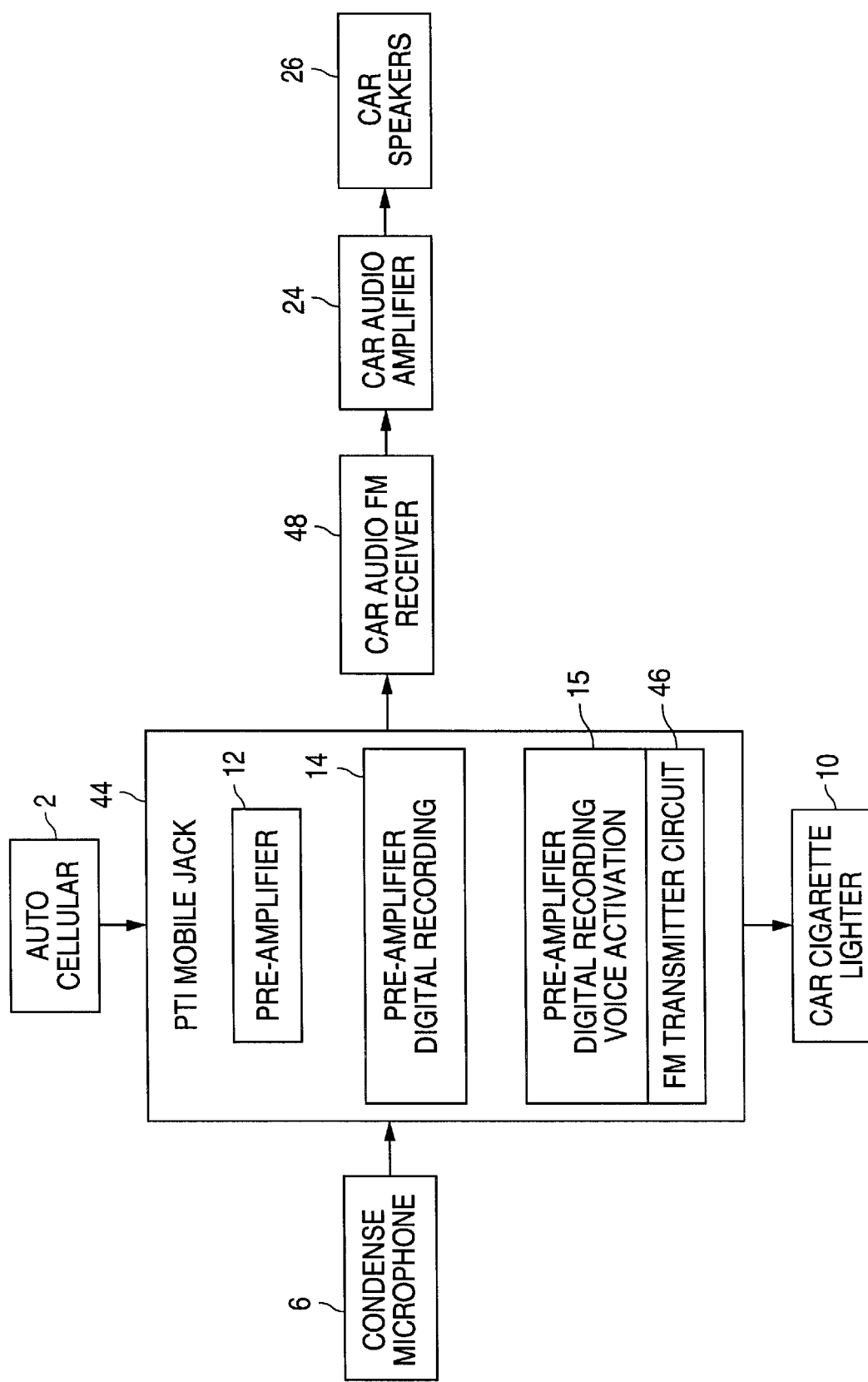
FIG. 4a is a block diagram of a preferred embodiment of the present invention according to a third aspect of the invention including a jack having a FM transmission feature.

FIG. 4a is a block diagram of a preferred embodiment of the present invention according to a third aspect of the invention. Again, similar features of the system described above with respect to FIGS. 2a–2b will not be repeated here. The hands-free kit according to the third aspect of the invention includes a jack 44 having a FM transmission feature. According to the third aspect, the jack 44 has an integrated FM transmitter circuit 46. The FM transmitter circuit 46 is configured to transmit audio data to the car audio FM receiver 48.

The FM transmitter circuit 46 is described in detail below with respect to FIG. 5, but a brief summary of its features is set forth here. The FM transmitter circuit 46 includes a frequency crystal, and the circuit is set at low power, e.g., less than one watt, and preferably a few milliwatts and les than a milliwatt, just so the transmission may be received within a two or three feet and may not be received by another reciever such as in another car on the road. The circuit 46 is preferably on a PCB board with other components used in this aspect of the invention (see below). The circuit may transmit at a frequency selected from multiple discreet preset frequencies or from the continuous FM reception band of the automobile audio system. Advantageously, a channel may be selected depending on the geographic location the automobile is in at the time of the cellular phone call for optimum reception.

Figure 4B:
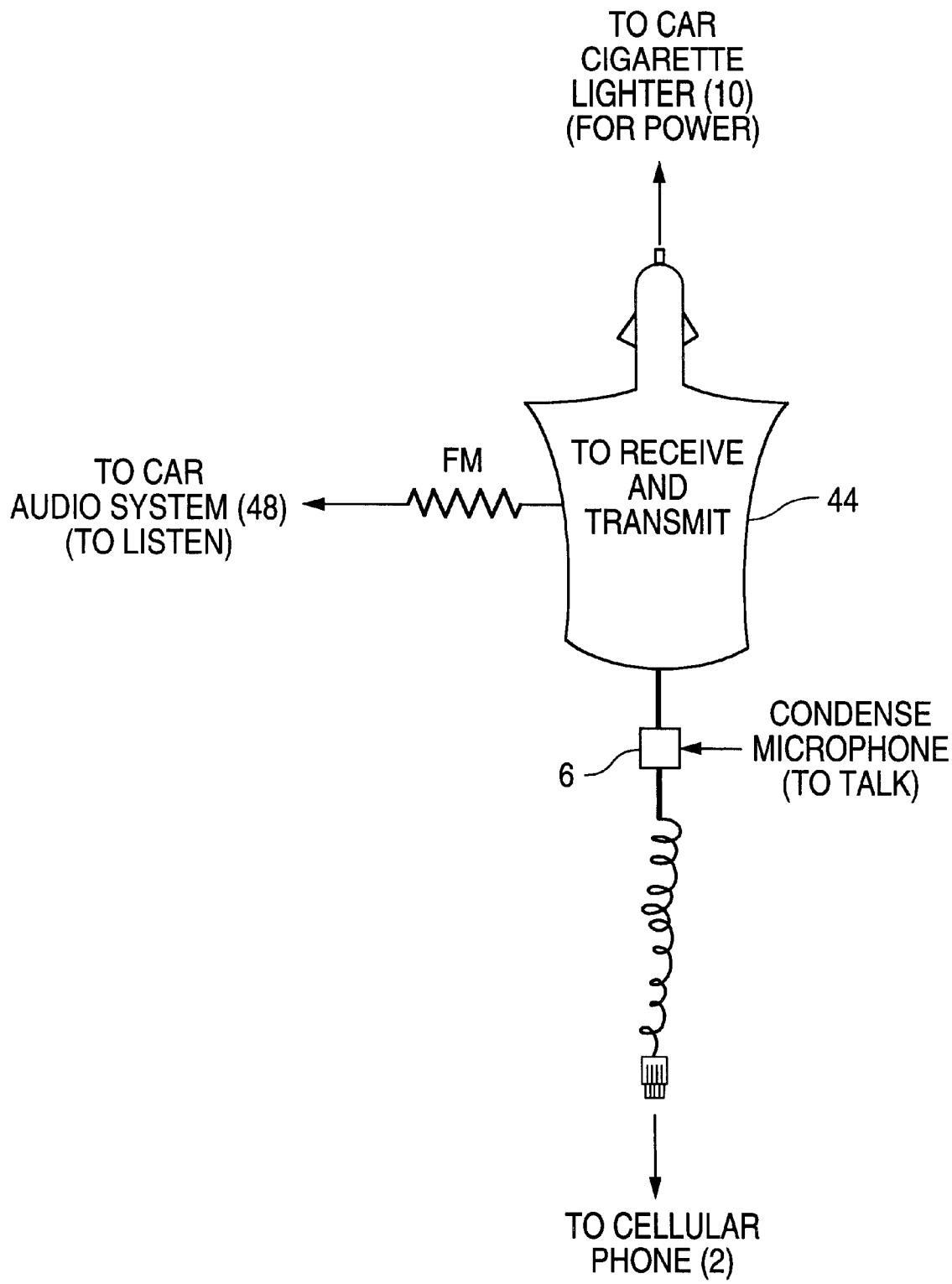

FIG. 4b shows schematically a hands-free kit according to the third aspect of the invention shown in block form in FIG. 4a. The hands-free kit shown schematically at FIG. 4b is the same as that shown in FIG. 2b, except the jack 44 has a circuit 46 for transmitting to car FM receiver 48, as described above with respect to FIG. 4a.

Figure 4C:
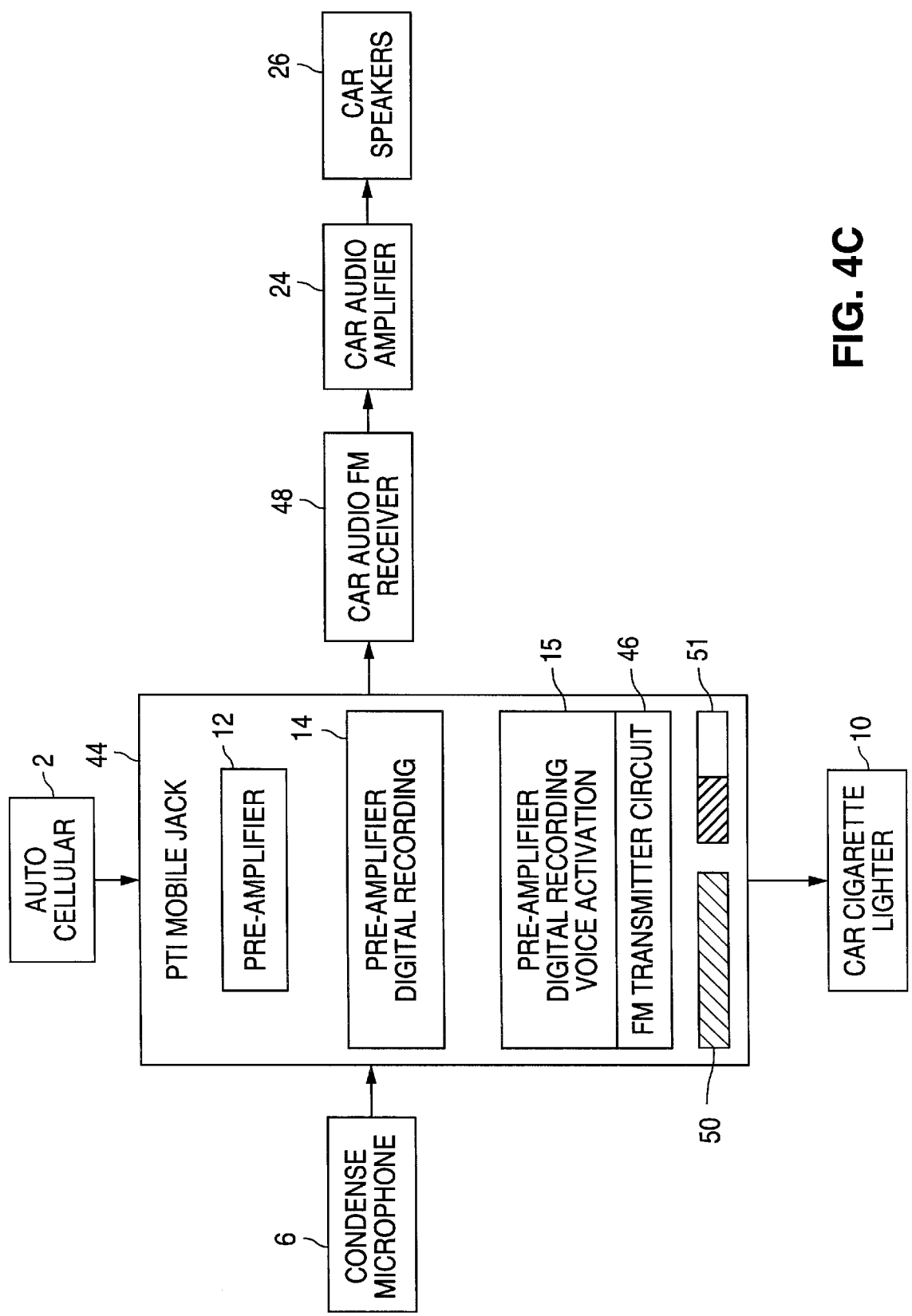
FIG. 4c is a block diagram of a preferred embodiment of the present invention according to a fourth aspect of the invention including a jack having a FM transmission feature, a speaker and a switch for selecting either the FM transmission feature or the speaker.

FIG. 4c shows schematically a fourth aspect of the invention. FIG. 4c is the same as FIG. 4a except that the jack 44 includes a speaker 50 such as that described above with respect to the first aspect. In this sense, the fourth aspect is a combination of the first and third aspects. The jack 44 also includes a switch 51 for selecting between using the FM transmitter circuit 46 and the car speakers 26, and using the speaker 50 of the jack 44. Advantageously, if there is no FM frequency that can be satisfactorily used, e.g., because each of the frequencies of the FM transmitter circuit 46 is being used by broadcast stations, or if the automobile that the user is riding in has no FM capability, then the speaker 50 may be used. Also advantageously, the switch 51 allows a user to switch being using the FM capability and the speaker 50 of the jack 44 without interrupting an existing cellular phone conversation.

Figure 4D:
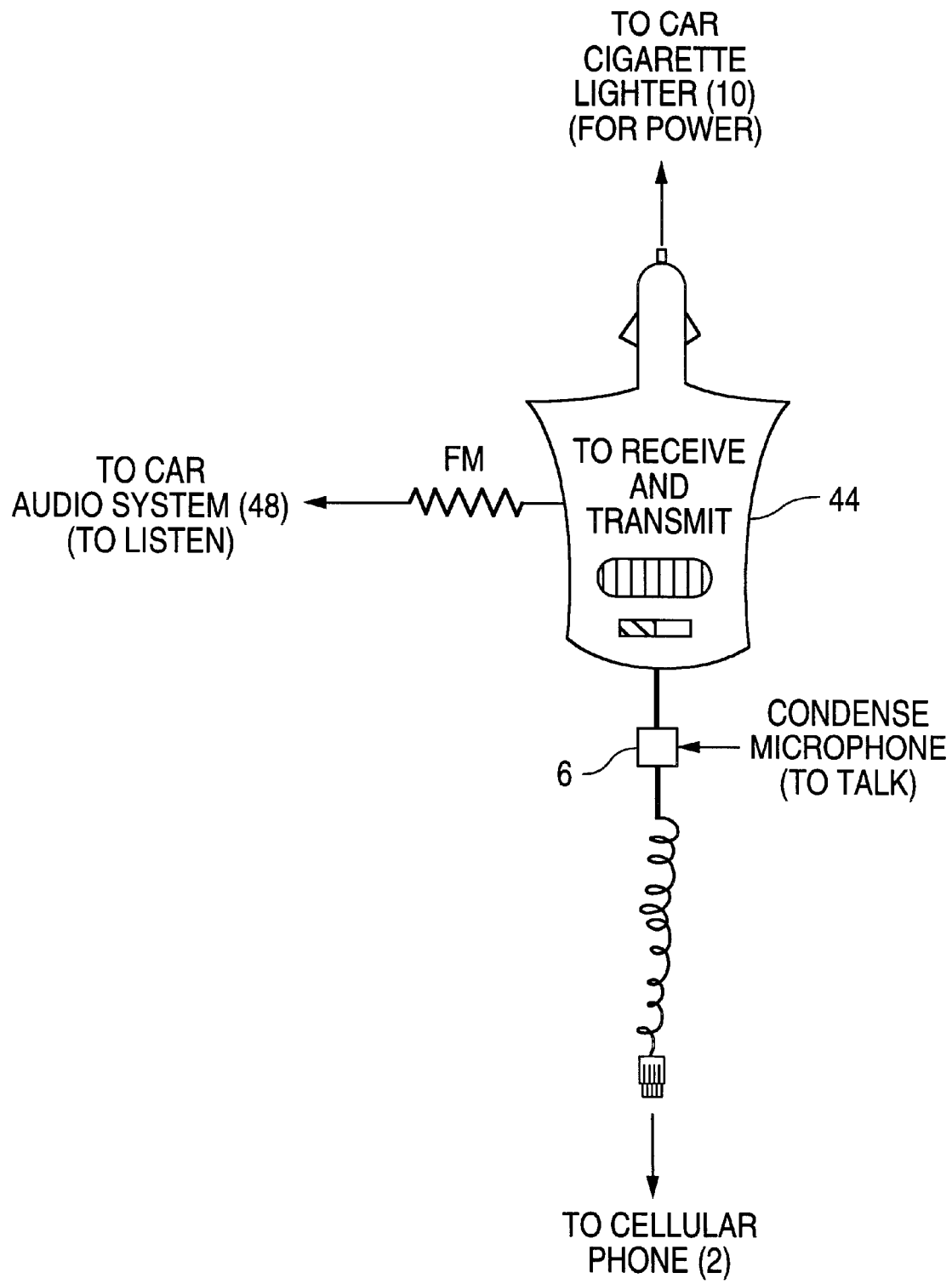
FIG. 4d shows schematically a jack according to the fourth aspect of the invention shown in block form in FIG. 4c.

FIG. 4d shows schematically a hands-free kit according to the fourth aspect of the invention shown in block form in FIG. 4c. The hands-free kit shown schematically at FIG. 4d is a combination of those shown in FIGS. 2b and 4b, and the jack 44 has an additional switch for selecting between using the circuit 46 for transmitting to car FM receiver 48, and using the speaker 50 of the jack 44 as described above with respect to FIG. 4c.

Figure 5:
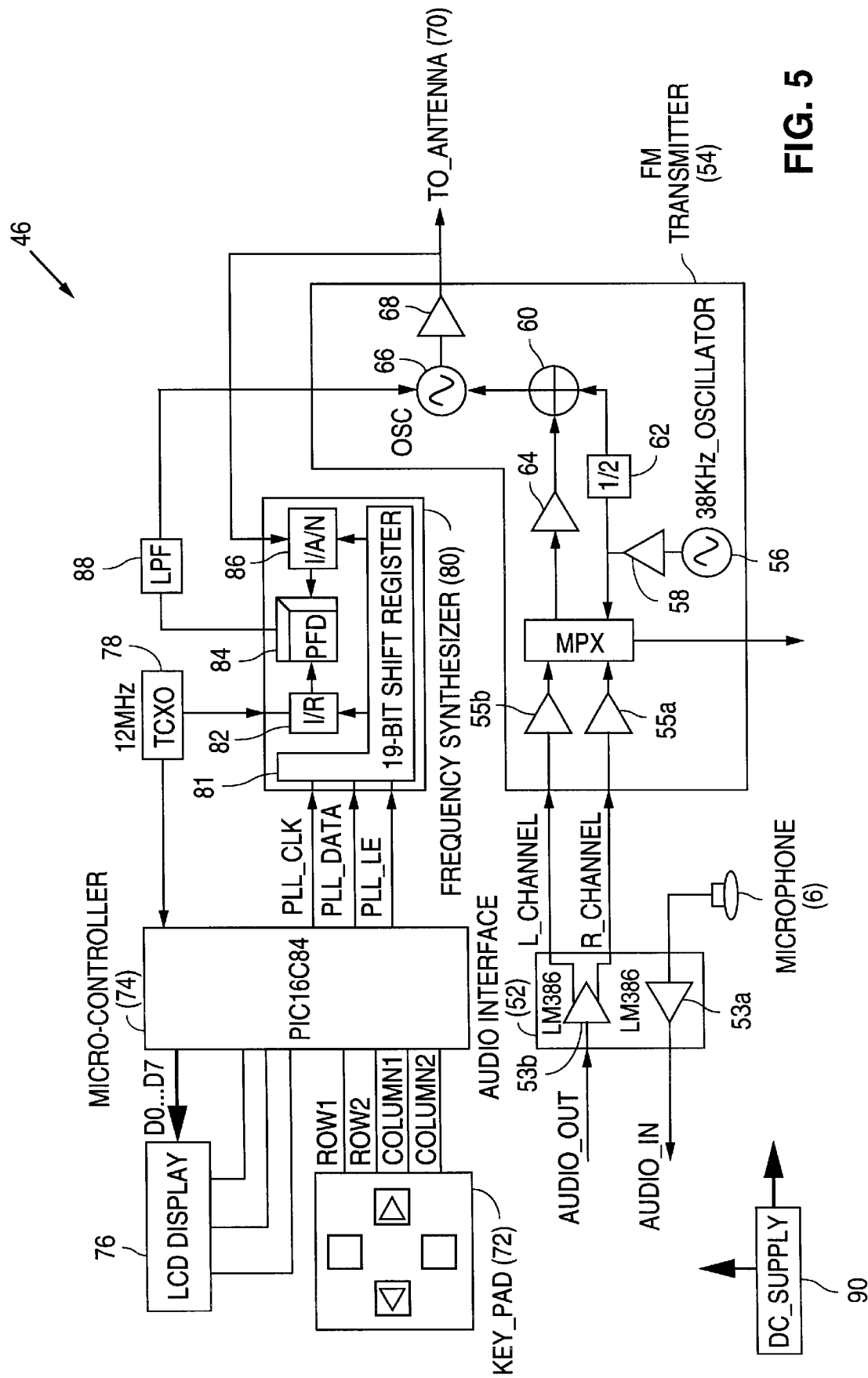
FIG. 5 is a FM transmitter circuit in accord with the third aspect of the invention.

FIG. 5 is a FM transmitter circuit 46 in accord with the third aspect of the invention. The FM transmitter circuit 46 either includes or is connected to a microphone that is preferably a condenser microphone 6 as discussed above. The audio information that is received by the condenser microphone 6 is received as audio input (AUDIO_IN) at an audio interface 52 of the FM transmitter circuit 46. This AUDIO_IN information is then amplified by an audio amplifier 53a to control the AUDIO_IN signal to be compatible with cellular phone 2 to which the jack 44 is conected. The amplified audio information is then transmitted to the person at the other end of the cellular phone conversation in the conventional manner through the cellular phone 2 of the user of the hands-free kit.

The audio interface 52 of the FM transmitter circuit 46 also receives audio information (AUDIO_OUT) from the cellular phone 2 connected to the jack 44 of the hands-free kit. This AUDIO_OUT is then amplified by an audio amplifier 53b to control the AUDIO_OUT signal to be compatible with the FM transmitter circuit 46 to which the cellular phone 2 is connected. This amplified audio information is preferably divided into a left channel (L CHANNEL) and a right channel (R CHANNEL) at the audio interface 52, as shown.

The amplified AUDIO_OUT information is then received by a FM transmitter 54 of the FM transmitter circuit 46. The audio information of the L_CHANNEL and the R_CHANNEL are amplified through audio amplifiers 55a and 55b, respectively as shown. The amplified L_CHANNEL and R_CHANNEL information are then received at a multiplexer MPX. The MPX also receives a signal from an oscillator 56 via a buffer amplifier 58 and from a ½ frequency divider 62. The oscillator 56 is shown as preferably a 38 kHz oscillator. The 19 kHz output of the ½ frequency divider 62 is then an input to an adder 60.

The MPX outputs a signal that is amplified at amplifier 64 and is also an input to the adder 60. As such, the adder 60 combines the input audio signal and the 19 kHz pilot. The output signal from the adder 60 is received at oscillator 66. Oscillator 66 is preferably a frequency modulator crystal and is preferably tunable continuously (i.e., within the discrete limits of the digital tuner) over the entire FM range. Alternatively, the oscillator 66 may be only tunable to two or a few discreet frequencies. In this way, a frequency may be selected depending on the geographic location the user is in and the FM frequencies that are available at that particular location. The output of the oscillator 66 is amplified at RF amplifier 68 to boost the RF power of the signal, which is transmitted to the antenna 70 of the car audio FM receiver 48. The output power is less than 1 Watt and is preferably around one or a few milliwatts, such that the transmission range is only a few feet.

The transmitting frequency is selected by the user and input to the transmitter circuit 46 via an input device such as a keypad 72, as shown. A processor or micro-controller 74 of the digitally controlled hands-free kit of the present invention receives the input information and outputs a signal to a display 76, preferably a liquid crystal display or LCD, or another display such as a light emitting diode or LED display, which visually informs the user which frequency is presently being selected for transmission to the antenna car audio FM receiver 48. The micro-controller 74 also receives a signal from a temperature compensated crystal TCXO 78 which is used as a reference. The microprocessor 74 and the TCXO 78 each also output signals to a frequency synthesizer 80 for frequency control. The frequency synthesizer 80 also receives a signal corresponding to the output signal of the FM tranmsitter 54 after the RF amplifier 68.

The frequency synthesizer 80 preferably includes a 19-bit shift register 81, an R counter (1/R) 82, a phase lock loop detector (PFD) 84, and a main counter (I/A/N) 86. The PFD 84 outputs to a loop filter (LPF) 88. The LPF 88 then outputs a signal to the oscillator 66, thus determining and controlling the transmission frequency of the FM transmitter 54 of the FM transmitter circuit 46.

A power supply 90 is also shown in FIG. 5. The power supply is preferably a DC supply. The power source for the power supply 90 may be separate from the cigarette lighter connection 10, or it may be the same. For example, the power supply 90 may be a battery (separate from the car battery or alternator that power the cigarette lighter).

Figure 6:
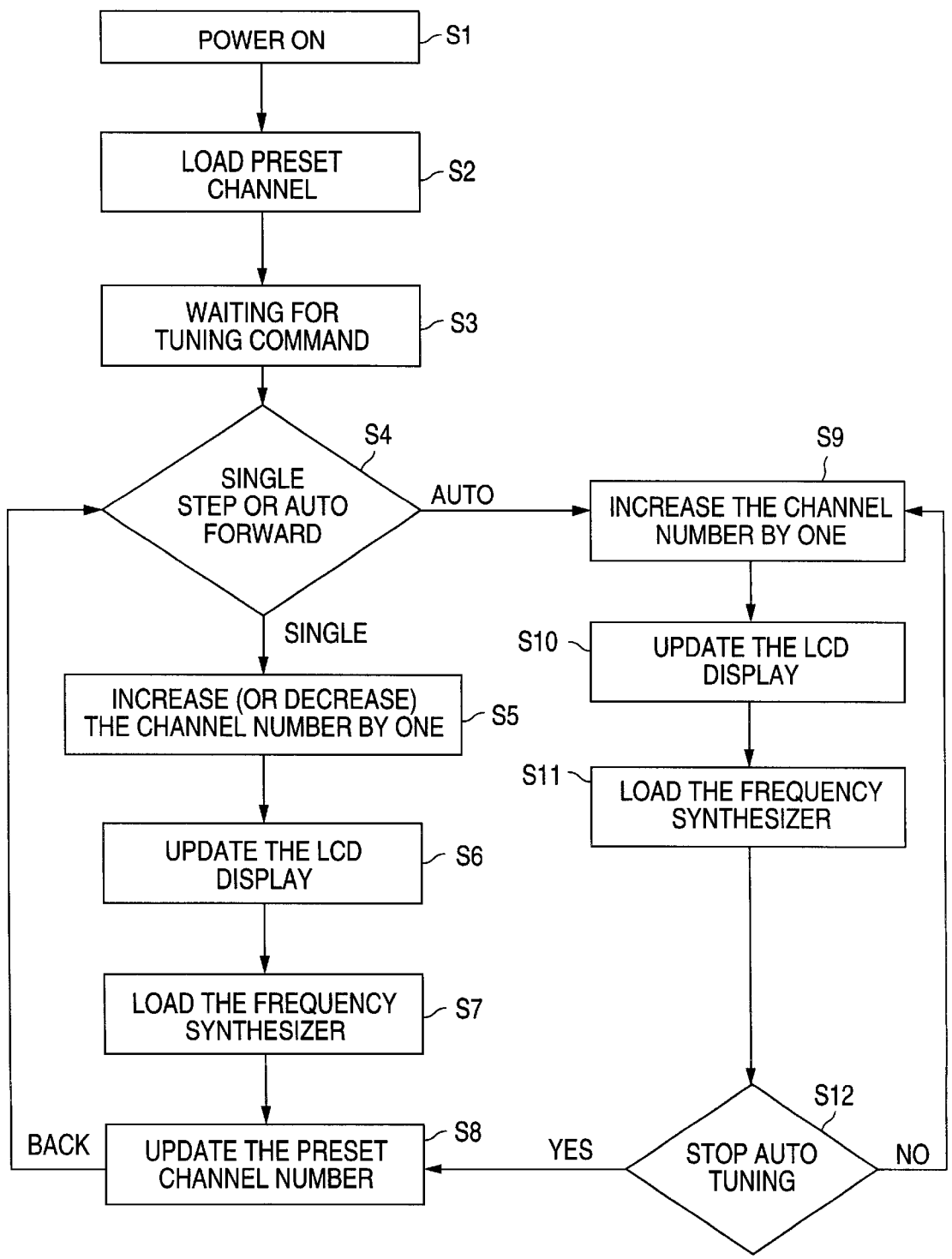
FIG. 6 is an operational control flowchart for a method according to the third aspect of the invention.

FIG. 6 is an operational control flowchart for a method according to the third aspect of the invention. FIG. 6 shows the steps in a preferred method of using the hands-free kit according to the third aspect of the invention, wherein FM transmission to a car stereo receiver 48 is used. It is noted here that alternative MMI procedures may be used and other optional steps may be added in accord with the present invention, such as preferred channel selection and preferred channel memory save for use with an auto tuning feature.

The first step S1 is to turn the power on to the hands-free kit, wherein the jack 44 is connected to the cellular phone 2. Step S2 is performed automatically as the microprocessor 74 of the FM transmitter circuit 46 tunes transmitter circuit to a preset frequency. In the next step S3, the system waits for a user to input a new frequency command. The tuning command, input in step S4, may be to step to the next digital frequency above or below the preset frequency, or an auto forward command may be input at step S4.

If a single step frequency input was performed at step S4, then the channel number increases or decreases by one digital frequency increment in step S5. The LCD display is updates in step S6, and the frequency synthesizer 80 is loaded such that the FM transmitter circuit 46 changes its transmission frequency to the newly input frequency at step S7. The preset channel number is updates to the present frequency, and the method can proceed back to step S4 if the user wishes to change the frequency again.

If auto forward is input at step S4, then the specific input frequency is changed to the next frequency available according to auto forward programming of the microprocessor 74, depending on which channels have been set as the programmed channels. The LCD display is updated in step S10 and the frequency synthesizer loaded in step S11, similar to steps S6 and S7 for single step tuning. If it is selected to stop auto tuning in step S12, then the preset channel number is updated (step S8) and the method returns to step S4 if the user wants to change the frequency again. If it is not selected to stop auto tuning in step S12, then the method returns to step S9 and the next available channel is tuned to.

Figure 7:
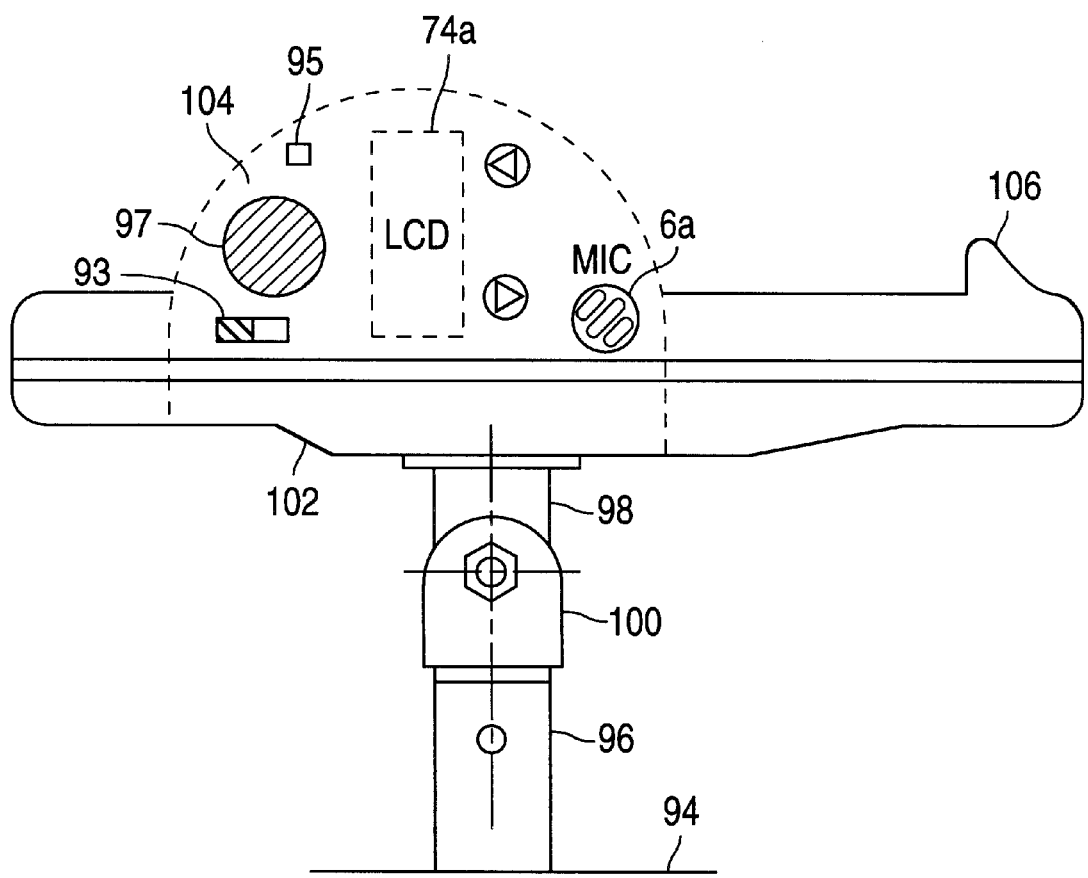
FIG. 7 shows a holder in accord with the present invention.

FIG. 7 shows a holder 92 in accord with the present invention. The holder 92 may be used in accord with any of the first, second, third or fourth aspects, including any of the alternative or optional configurations of those aspects of the invention described above. The holder 92 may have any of the jacks 4, 34 or 44, including any of the optional, alternative and/or additional configurations of the above described aspects of the invention integrated within it, or the jacks 4, 34, 44 may be separate components from the holder 92. Those features of the holder that are identical to the jacks 4, 34 or 44 described above will not be described below, and all of the description of the jacks 4, 34 and 44 above may be integrated with the holder 92. For example, the microphone 6a and LCD display 74a (feature of the third aspect, see FIGS. 5–6) are shown in FIG. 7. Also, connections to the cellular phone 2 and cigarette lighter 10, as well as the means 12, 14, 15 and/or 46 to transmit by integrated speaker 97 or car speakers 26 may be incorporated within the holder 92. The speaker 97 of the holder may be in addition to the speaker 16, 40 or 50 already provided with the jack 4, 34 or 44, respectively. Moreover, a switch 93 is provided having the function of any of the switches 42 or 50 described above, and the switch 93 may switch between the car speakers 26, the speaker 16, 40 or 50 of the jack 4, 34 or 44, respectively, and the speaker 97 of the holder 92. More than one switch may be provided to perform these switching functions. Furthermore, the holder 92 may have an IR transmitter 95 having the same function as the IR transmitter 38 described above with respect to the second aspect.

The holder 92 has a base 94 preferably as shown which may be adhesively attached to a surface such as a dashboard. Alternatively, the base may have a clip for attaching to the louvres of an air conditioning or heater vent or another automobile interior element. A lower support arm 96 is connected to base 94. The lower support arm 96 is preferably fixed to the base 94. The lower support arm 96 is pivotably connected with an upper support arm 98. A pivot section 100 connects the lower and upper support arms 96, 98. The pivot section 100 permits the upper arm 98 to rotate about the elongated axis of the lower support arm 96. The pivot section 100 also permits angular rotation between the elongated axes of the upper and lower support arms 98, 96. In this way, the upper arm 98 and the lower arm 96 are adjustably positionable along two orthogonal rotational coordinate directions, and thus the holder 92 provides additional features not provided by any of the jacks 4, 34 or 44. This dual-axis rotational positionability feature is advantageous for positioning the phone to dial, to listen if the speaker 16 of the holder 92 is used for listening, to position the microphone 6a, or to position the phone 2 or holder 92 to be in reach in case the user needs to physically access the phone 2 or holder 92, e.g., to tune the frequency according to the third aspect of the invention.

The upper support arm connects with a support carriage 102. The support carriage 102 physically supports the phone 2. A pair of side flaps 104 grip the phone 2 and a ridge 106 provides additional support especially when the upper arm 98 is pivoted downward relative to gravity. The carriage also may be translationally moveable relative to the support arms 96, 98. This additional degree of freedom allows the phone 2 to be positioned around other objects in the car or allows the phone to be closer to a user, e.g., whether the user is the driver of the passenger. This translational degree of freedom may be provided at the base/lower arm connection as well. More than one translational degree of freedom may be provided.

The above objects of the invention are met. Advantageously, a person may speak to another person via cellular connection without having a hand on a cellular phone handset 2. This allows the person to have both hands on the wheel, e.g., or one hand on the wheel and the other on a stick shift. A person having a conversation by cellular phone in an automobile is much safer, as are those around him, when he can have the conversation "hands-free" as when using the system of the present invention including the jack 4, 34, 44 of the hands-free kit connected to the condenser microphone 6. The condenser microphone 6 also allows for convenient conference calling otherwise generally not available by cellular connection. Two or more persons riding in a car may advantageously participate in a conference call using when the cellular telephone 2 is connected to a hands-free kit 4 connected to the condenser microphone 6.

The hands-free kit of the second and third aspects advantageously permits communication using the speakers 20 of the audio system of the automobile within which the user is riding. In combination with the function of the condenser microphone 6, the use of the speakers 20 of the car stereo for listening provides a completely hands-free cellular conversation. Moreover, the words of the person talking on the other end of the cellular connection are easily heard through the car speakers by everyone in the car.

The hands-free kit is advantageously plugged into the cigarette lighter 10 of a car. The connection with the cigarette lighter 10 provides the power needed to maintain a cellular connection between the cellular phone 2 of the user and another cellular phone without draining battery power such as the battery of the cellular phone 2. The cigarette lighter 10 also advantageously recharges the battery of the cellular phone 2 when both the hands-free kit 4 is connected to both the cellular phone 2 and the cigarette lighter 10, and the battery of the cellular phone 2 is connected to the phone 2. Of course, because the cigarette lighter may power the phone 2 itself, the battery of the cellular phone 2 need not even be connected to the phone 2 for the user to have a cellular conversation when the phone 2 is connected via the hands-free kit to the cigarette lighter 10.

Advantageously, all or a portion of a cellular conversation or a user's personal notes may be recorded for future reproduction and reference. A user may record a phone number or some other difficult to remember information using the recording function of the hands-free kit. The user need not look for a pen and paper to write down the information, and then write the information while he is driving. Thus, the enhanced system provides enhanced safety as well as convenience.

In addition, voice-activation of a cellular connection is provided including putting the phone 2 into ready mode and dialing a phone number. The system including the voice activation preamplifier and chip may be programmed to translate word inputs to dialing number instructions. Phone numbers may be stored according to their location or the person on the other end for easy voice activation without a user needing to remember and actually speak the number he wishes to call. The user may input by voice dialing instructions such as the type of phone call and the number to be called. The audio input may be substituted for or complementary with input to/from the keypad of the handset 2. Advantageously, the voice activation feature allows a user to activate the phone 2 and call a number without having a hand on the cellular handset 2. This feature of the system is thus even safer and more convenient for the user.

A hands-free kit box is included in an appendix. The box illustrates how safety is enhanced when the system is used and shows a preferred embodiment of the system connected to a cellular phone (back). A preliminary product information flyer is also included in the appendix.

The specific embodiments described in the specification, drawings, summary of the invention and abstract of the disclosure are not intended to limit the scope of any of the claims, but are only meant to provide illustrative examples of the invention to which the claims are drawn. The scope of the present invention is understood to be encompassed by the language of the claims, and structural and functional equivalents thereof.

What is claimed is:

1. A hands-free mobile telephone kit, comprising:
a jack including an audio-FM converter, a FM transmitter circuit and a speaker, said jack connected to a mobile telephone,
wherein said jack is configured to receive, convert and transmit a first signal, which is received by said mobile telephone from a remote signal source connected over a mobile connection to the mobile telephone, to a FM receiver of an audio system for subsequent audio transmission over a speaker system connected to said audio system, and wherein said jack is further configured to receive and transmit said first signal for audio transmission over said speaker of said jack, and wherein said jack further comprises a switch for selecting between enabling said speaker of said jack and said speaker system of said audio system, wherein said circuit comprises:
- an audio interface connected to said first microphone for receiving said first signal;
- a micro-controller for processing a frequency selection input from an input device;
- a frequency synthesizer for receiving frequency information from said micro-controller; and
- a FM transmitter for receiving the frequency information synthesized by said frequency synthesizer, receiving said first signal from said audio interface, and transmitting said first signal at the selected frequency based on the frequency information to the FM receiver.

2. A hands-free mobile telephone kit, comprising:
a jack including an audio-FM converter, a FM transmitter circuit and a speaker, said jack connected to a mobile telephone, wherein said jack is configured to receive, convert and transmit a first signal, which is received by said mobile telephone from a remote signal source connected over a mobile connection to the mobile telephone, to a FM receiver of an audio system for subsequent audio transmission over a speaker system connected to said audio system, and wherein said jack is further configured to receive and transmit said first signal for audio transmission over said speaker of said jack, and wherein said jack further comprises a switch for selecting between enabling said speaker of said jack and said speaker system of said audio system, and wherein the transmitter is configured for transmitting at a selected one of a plurality of available FM frequencies for transmitting the first signal to the FM receiver, wherein the jack includes a display which shows the selected frequency.

3. A hands-free mobile telephone kit, comprising:
a jack including an audio-FM converter and a FM transmitter circuit, said jack connected to a mobile telephone, wherein said jack is configured to receive, convert and transmit a first signal, which is received by said mobile telephone from a remote signal source connected over a mobile connection to the mobile telephone, to a FM receiver of an audio system for subsequent audio transmission over a speaker system connected to said audio system, and wherein said circuit comprises:
- an audio interface connected to said first microphone for receiving said first signal;
- a micro-controller for processing a frequency selection input from an input device;
- a frequency synthesizer for receiving frequency information from said micro-controller; and
- a FM transmitter for receiving the frequency information synthesized by said frequency synthesizer, receiving said first signal from said audio interface, and transmitting said first signal at the selected frequency based on the frequency information to the FM receiver.

4. The hand-free kit of claim 3, wherein said jack further comprises a speaker, and wherein said jack is further configured to receive and transmit said first signal for audio transmission over said speaker of said jack, and wherein said jack further comprises a switch for selecting between enabling said speaker of said jack and said speaker system of said audio system.

5. The hands-free kit of claim 3, wherein the transmitter is configured for transmitting at a selected one of a plurality of available FM frequencies for transmitting the first signal to the FM receiver.

6. The hands-free kit of claim 3, wherein the transmitter is configured for transmitting at a selected one of a continuous range of available FM frequencies for transmitting the first signal to the FM receiver.

7. The hands-free kit of claim 3, wherein the jack is further configured to hold the mobile telephone.

8. The hands-free kit of claim 7, wherein the jack is rotatably adjustable.

9. The hands-free kit of claim 8, wherein the jack is also translationally adjustable.

10. The hands-free kit of claim 7, wherein the jack is rotatably adjustable in two independent directions.

11. The hands-free kit of claim 3, further comprising a holder configured to hold the mobile telephone, said holder including an integrated speaker, wherein said holder is configured to receive and retransmit said first signal through said integrated speaker of said holder.

12. The hands-free kit of claim 11, wherein the holder includes a display which shows the selected frequency.

13. The hands-free kit of claim 11, said switch for selecting between using any of said speaker of said jack, said speaker system of said audio system, and said integrated speaker of said holder.

14. The hands-free kit of any of claims 3 or 13, wherein the switch is configured to perform said selecting function during a mobile connection without breaking the mobile connection.

15. The hands-free kit of claim 3, wherein the jack includes a display which shows the selected frequency.

16. A hands-free mobile telephone kit, comprising:
a jack including an audio-FM converter and a FM transmitter circuit, said jack connected to a mobile telephone, wherein said jack is configured to receive, convert and transmit a first signal, which is received by said mobile telephone from a remote signal source connected over a mobile connection to the mobile telephone, to a FM receiver of an audio system for subsequent audio transmission over a speaker system connected to said audio system, and wherein the transmitter is configured for transmitting at a selected one of a plurality of available FM frequencies for transmitting the first signal to the FM receiver, and wherein the jack includes a display which shows the selected frequency.

17. A hands-free mobile telephone kit, comprising:
a jack including an audio-FM converter and a FM transmitter circuit, said jack connected to a mobile telephone, wherein said jack is configured to receive, convert and transmit a first signal, which is received by said mobile telephone from a remote signal source connected over a mobile connection to the mobile telephone, to a FM receiver of an audio system for subsequent audio transmission over a speaker system connected to said audio system, and wherein the transmitter is configured for transmitting at a selected one of a continuous range of available FM frequencies for transmitting the first signal to the FM receiver, and wherein the jack includes a display which shows the selected frequency.

18. The hands free kit of any of claims 16 or 17, wherein said circuit comprises:

an audio interface connected to said first microphone for receiving said first signal;

a micro-controller for processing a frequency selection input from an input device;

a frequency synthesizer for receiving frequency information from said micro-controller; and a FM transmitter for receiving the frequency information synthesized by said frequency synthesizer, receiving said first signal from said audio interface, and transmitting said first signal at the selected frequency based on the frequency information to the FM receiver.

19. The hand-free kit of any of claims 16 or 17, wherein said jack further comprises a speaker, and wherein said jack is further configured to receive and transmit said first signal for audio transmission over said speaker of said jack, and wherein said jack further comprises a switch for selecting between enabling said speaker of said jack and said speaker system of said audio system.

20. The hands-free kit of claim 19, wherein the switch is configured to perform said selecting function during a mobile connection without breaking the mobile connection.

21. The hands-free kit of any of claims 16 or 17, wherein the jack is further configured to hold the mobile telephone.

22. The hands-free kit of claim 21, wherein the jack is rotatably adjustable.

23. The hands-free kit of claim 22, wherein the jack is also translationally adjustable.

24. The hands-free kit of claim 21, wherein the jack is rotatably adjustable in two independent directions.

25. The hands-free kit of claim 21, further comprising a holder configured to hold the mobile telephone, said holder including an integrated speaker, wherein said holder is configured to receive and retransmit said first signal through said integrated speaker of said holder.

26. The hands-free kit of claim 25, said switch for selecting between using any of said speaker of said jack, said speaker system of said audio system, and said integrated speaker of said holder.

27. The hands-free kit of claim 26, wherein the switch is configured to perform said selecting function during a mobile connection without breaking the mobile connection.

28. The hands-free kit of claim 25, wherein the holder includes a display which shows the selected frequency.

29. A hands-free mobile telephone kit, comprising:

a holder for holding a mobile telephone, the holder including an audio-FM converter, a FM transmitter circuit and a speaker, said holder connected to the mobile telephone, wherein said holder is configured to receive, convert and transmit a first signal, which is received by said mobile telephone from a remote signal source connected over a mobile connection to the mobile telephone, to a FM receiver of an audio system for subsequent audio transmission over a speaker system connected to said audio system, and wherein said holder is further configured to receive and transmit said first signal for audio transmission over said speaker of said holder, wherein said circuit comprises:

an audio interface connected to said first microphone for receiving said first signal;

a micro-controller for processing a frequency selection input from an input device;

a frequency synthesizer for receiving frequency information from said micro-controller; and a FM transmitter for receiving the frequency information synthesized by said frequency synthesizer, receiving said first signal from said audio interface, and transmitting said first signal at the selected frequency based on the frequency information to the FM receiver.

30. A hands-free mobile telephone kit, comprising:

a holder for holding a mobile telephone, the holder including an audio-FM converter, a FM transmitter circuit and a speaker, said holder connected to the mobile telephone, wherein said holder is configured to receive, convert and transmit a first signal, which is received by said mobile telephone from a remote signal source connected over a mobile connection to the mobile telephone, to a FM receiver of an audio system for subsequent audio transmission over a speaker system connected to said audio system, and wherein said holder is further configured to receive and transmit said first signal for audio transmission over said speaker of said holder, wherein the transmitter is configured for transmitting at a selected one of a plurality of available FM frequencies for transmitting the first signal to the FM receiver, wherein the holder includes a display which shows the selected frequency.

31. A hands-free cellular telephone kit, comprising:

a jack including an audio-FM converter and an FM transmitter circuit, said jack connected to a cellular telephone; and a first microphone connected to the jack, and wherein said jack is configured to receive, convert and transmit a first signal to a FM receiver of an audio system for subsequent audio transmission over a speaker system connected to said audio system, and wherein said jack is further configured to re-transmit a second signal to the cellular telephone which then re-transmits the second signal to a remote signal source, and wherein said jack is configured to receive and retransmit the second signal when the cellular telephone is positioned away from the source of the second signal wherein the jack is further configured as a holder to hold the cellular telephone, wherein said circuit comprises:

an audio interface connected to said first microphone for receiving said first signal;

a micro-controller for processing a frequency selection input from an input device, a frequency synthesizer for receiving frequency information from said micro-controller; and a FM transmitter for receiving the frequency information synthesized by said frequency synthesizer, receiving said first signal from said audio interface, and transmitting said first signal at the selected frequency based on the frequency information to the FM receiver.

32. A hands-free cellular telephone kit, comprising:
a jack including an audio-FM converter and FM transmitter circuit, said jack being connected to a cellular telephone;
a first microphone connected to the jack; and
a holder configured to hold the cellular telephone, said holder including an integrated speaker, wherein said holder is configured to receive, amplify and retransmit a first signal through said integrated speaker of said holder, and
wherein said jack is configured to receive, convert and transmit a first signal to a FM receiver of an audio system for subsequent audio transmission over a speaker system connected to said audio system, said first signal being received by the cellular telephone from a remote signal source connected over a
wherein said jack is configured to retransmit a second signal to the cellular telephone for subsequent retransmission to the remote signal source, and
wherein said jack is configured to retransmit the second signal when The cellular telephone is positioned away from the source of the second signal,
wherein said circuit comprises:
an audio interface connected to said first microphone for receiving said first signal;
a micro-controller for processing a frequency selection input from an input device;
a frequency synthesizer for receiving frequency information from said micro-controller; and
a FM transmitter for receiving the frequency information synthesized by said frequency synthesizer, receiving said first signal from said audio interface, and transmitting said first signal at the selected frequency based on the frequency information to the FM receiver.

33. A hands-free cellular telephone kit, comprising:
a jack including an audio-FM converter and an FM transmitter circuit, said jack connected to a cellular telephone; and
a first microphone connected to the jack, and
wherein said jack is configured to receive, convert and transmit a first signal to a FM receiver of an audio system for subsequent audio transmission over a speaker system connected to said audio system, and
wherein said jack is further configured to re-transmit a second signal to the cellular telephone which then re-transmits the second signal to a remote signal source, and
wherein said jack is configured to receive and retransmit the second signal when the cellular telephone is positioned away from the source of the second signal, and
wherein the jack is further configured as a holder to hold the cellular
wherein the transmitter is configured for transmitting at a selected one of a plurality of available FM frequencies for transmitting the first signal to the FM receiver,
wherein the jack includes a display which shows the selected frequency.

34. A hands-free cellular telephone kit, comprising:
a jack including an audio-FM converter and FM transmitter circuit, said jack being connected to a cellular telephone;
a first microphone connected to the jack; and
a holder configured to hold the cellular telephone, said holder including an integrated speaker, wherein said holder is configured to receive, amplify and retransmit a first signal through said integrated speaker of said holder, and
wherein said jack is configured to receive, convert and transmit the first signal to a FM receiver of an audio system for subsequent audio transmission over a speaker system connected to said audio system, said first signal being received by the cellular telephone from a remote signal source connected over a cellular connection to the cellular telephone, and
wherein said jack is configured to retransmit a second signal to the cellular telephone for subsequent retransmission to the remote signal source, and
wherein said jack is configured to retransmit the second signal when the cellular telephone is positioned away from the source of the second signal, and
wherein the transmitter is configured for transmitting at a selected one of a plurality of available FM frequencies for transmitting the first signal to the FM receiver, and
wherein the jack includes a display which shows the selected frequency.

35. A hands-free cellular telephone kit, comprising:
a jack including an audio-FM converter and an FM transmitter circuit, said jack connected to a cellular telephone; and
a first microphone connected to the jack, and
wherein said jack is configured to receive, convert and transmit a first signal to a FM receiver of an audio system for subsequent audio transmission over a speaker system connected to said audio system, and
wherein said jack is further configured to re-transmit a second signal to the cellular telephone which then re-transmits the second signal to a remote signal source, and
wherein said jack is configured to receive and retransmit the second signal when the cellular telephone is positioned away from the source of the second signal, and
wherein the jack is further configured as a holder to hold the cellular telephone,
wherein said jack is configured to retransmit the second signal when the cellular telephone is positioned away from the source of the second signal, and
wherein the transmitter is configured for transmitting at a selected one of a continuous range of available FM frequencies for transmitting the first signal to the FM receiver,
wherein the jack includes a display which shows the selected frequency.

36. A hands-free cellular telephone kit, comprising:
a jack including an audio-FM convener and FM transmitter circuit, said jack being connected to a cellular telephone;
a first microphone connected to the jack; and
a holder configured to hold the cellular telephone, said holder including an integrated speaker, wherein said holder is configured to receive, amplify and retransmit a first signal through said integrated speaker of said holder, and
wherein said jack is configured to receive, convert and transmit a first signal to a FM receiver of an audio system for subsequent audio transmission over a speaker system connected to said audio system, said first signal being received by the cellular telephone from a remote signal source connected over a cellular connection to the cellular telephone, and wherein said jack is configured to retransmit a second signal to the cellular telephone for subsequent retransmission to the remote signal source, and wherein said jack is configured to retransmit the second signal when the cellular telephone is positioned away from the source of the second signal, and wherein the transmitter is configured for transmitting at a selected one of a continuous range of available FM frequencies for transmitting the first signal to the FM receiver, wherein the jack includes a display which shows the selected frequency.

37. A hands-free mobile telephone kit, comprising:

a holder for holding a mobile telephone, the holder including an audio-FM converter, a FM transmitter circuit and a speaker, said holder connected to the mobile telephone, wherein said holder is configured to receive, convert and transmit a first signal, which is received by said mobile telephone from a remote signal source connected over a mobile connection to the mobile telephone, to a FM receiver of an audio system for subsequent audio transmission over a speaker system connected to said audio system, and wherein said holder is further configured to receive and transmit said first signal for audio transmission over said speaker of said holder, wherein the transmitter is configured for transmitting at a selected one of a continuous range of available FM frequencies for transmitting the first signal to the FM receiver, wherein the holder includes a display which shows the selected frequency.

* * * * *